(12) United States Patent
Wright

(10) Patent No.: US 11,655,329 B2
(45) Date of Patent: May 23, 2023

(54) DELAYED ACTION CATALYSTS FOR DUAL CURE ADDITIVE MANUFACTURING RESINS

(71) Applicant: Carbon, Inc., Redwood City, CA (US)

(72) Inventor: Andrew Gordon Wright, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 60 days.

(21) Appl. No.: 17/234,019

(22) Filed: Apr. 19, 2021

(65) Prior Publication Data

US 2021/0332178 A1 Oct. 28, 2021

Related U.S. Application Data

(60) Provisional application No. 63/014,908, filed on Apr. 24, 2020.

(51) Int. Cl.
| | | |
|---|---|---|
| C08F 2/46 | (2006.01) | |
| C08F 2/50 | (2006.01) | |
| C08G 61/04 | (2006.01) | |
| C08G 18/48 | (2006.01) | |
| C08G 18/16 | (2006.01) | |
| C08G 18/73 | (2006.01) | |
| B33Y 70/00 | (2020.01) | |

(52) U.S. Cl.
CPC ............ *C08G 18/482* (2013.01); *B33Y 70/00* (2014.12); *C08G 18/168* (2013.01); *C08G 18/73* (2013.01)

(58) Field of Classification Search
CPC ....... B29C 64/30; B29C 64/35; B29C 64/124; B33Y 70/00; B33Y 40/20; B33Y 10/00; C08F 290/067; C08G 18/168; C08G 18/73; C08G 18/3206; C08G 18/482; C08G 18/48; C08G 18/4277; C08G 18/672; C08G 18/1866; C08G 18/4018; C08G 18/66
USPC ........... 522/38, 33, 6, 189, 184, 71, 1; 520/1
See application file for complete search history.

(56) References Cited

U.S. PATENT DOCUMENTS

| | | | |
|---|---|---|---|
| 3,213,058 A | 10/1965 | Boyle et al. | |
| 3,694,389 A | 9/1972 | Levy | |
| 5,236,637 A | 8/1993 | Hull | |
| 5,391,072 A | 2/1995 | Lawton et al. | |
| 5,529,473 A | 6/1996 | Lawton et al. | |
| 6,433,121 B1 | 8/2002 | Petrovic et al. | |
| 6,861,475 B2 | 3/2005 | Ilenda et al. | |
| 6,894,113 B2 | 5/2005 | Court et al. | |
| 6,916,867 B2 | 7/2005 | Gugumus | |
| 7,157,586 B2 | 1/2007 | Wood et al. | |
| 7,438,846 B2 | 10/2008 | John | |
| 7,625,977 B2 | 12/2009 | Lutz et al. | |
| 7,642,316 B2 | 1/2010 | Rego et al. | |
| 7,695,643 B2 | 4/2010 | Fritzsche et al. | |
| 7,820,760 B2 | 10/2010 | Pham et al. | |
| 7,892,474 B2 | 2/2011 | Shkolnik et al. | |
| 8,088,245 B2 | 1/2012 | Lutz et al. | |
| 8,110,135 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,782,947 B2 | 10/2017 | Gunzel et al. | |
| 10,259,171 B2 | 4/2019 | Robeson et al. | |
| 10,434,706 B2 | 10/2019 | Robeson et al. | |
| 11,241,822 B2* | 2/2022 | Pinschmidt, Jr. | ... C08F 290/067 |
| 2004/0053159 A1* | 3/2004 | Wilke | .................. C09D 175/16 430/905 |
| 2007/0027233 A1 | 2/2007 | Yamaguchi et al. | |
| 2010/0280151 A1 | 11/2010 | Nguyen et al. | |
| 2013/0032375 A1 | 2/2013 | Georlette et al. | |
| 2013/0292862 A1 | 11/2013 | Joyce | |
| 2013/0295212 A1 | 11/2013 | Chen et al. | |
| 2015/0240113 A1 | 8/2015 | Pratt et al. | |
| 2015/0331402 A1 | 11/2015 | Lin et al. | |
| 2015/0360419 A1 | 12/2015 | Willis et al. | |
| 2016/0288376 A1 | 10/2016 | Sun et al. | |
| 2017/0129167 A1 | 5/2017 | Castanon | |
| 2017/0129169 A1 | 5/2017 | Batchelder et al. | |
| 2018/0126630 A1 | 5/2018 | Panzer et al. | |

(Continued)

FOREIGN PATENT DOCUMENTS

| | | |
|---|---|---|
| EP | 1632533 A1 | 3/2006 |
| EP | 2123711 A1 | 11/2009 |

(Continued)

OTHER PUBLICATIONS

Ha et al, Properties of UV-Curable Polyurethane Acrylates Using Nonyellowing polyisocyanate for Floor Coating, 1996, Journal of Applied Polymer Science, vol. 62, 1011-1021 (Year: 1996).*

(Continued)

*Primary Examiner* — Jessica Whiteley
(74) *Attorney, Agent, or Firm* — Myers Bigel, P.A.

(57) ABSTRACT

Provided herein is a dual cure resin useful for the production of an object by additive manufacturing, comprising or consisting essentially of: (a) a photoinitiator; (b) not more than 5, 10 or 20 ppm of a polyurethane catalyst (e.g., tin, tertiary amine, bismuth, zinc, zirconium, or nickel catalysts); (c) a polyol; (d) free (i.e., unblocked) polyisocyanate; and (e) blocked polyisocyanate, the isocyanate groups of which are blocked by reaction with an amine (meth)acrylate blocking agent. Methods of making an object with the resin are also provided.

16 Claims, No Drawings

(56) References Cited

U.S. PATENT DOCUMENTS

| | | |
|---|---|---|
| 2018/0243976 A1 | 8/2018 | Feller |
| 2018/0290374 A1 | 10/2018 | Willis et al. |
| 2019/0160733 A1 | 5/2019 | Mirkin et al. |
| 2020/0377745 A1* | 12/2020 | Drazba ................ C08G 18/638 |
| 2021/0245428 A1* | 8/2021 | Pinschmidt, Jr. ........ B01J 31/12 |
| 2022/0118690 A1* | 4/2022 | Pinschmidt, Jr. ....... C08L 75/16 |
| 2022/0203609 A1* | 6/2022 | Rolland .................. G03F 7/038 |

FOREIGN PATENT DOCUMENTS

| | | | |
|---|---|---|---|
| WO | 2015164234 A1 | 10/2015 | |
| WO | WO-2017112751 A1 * | 6/2017 | ........... B29C 64/124 |
| WO | 2017210298 A1 | 12/2017 | |

OTHER PUBLICATIONS

Janusziewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

* cited by examiner

DELAYED ACTION CATALYSTS FOR DUAL CURE ADDITIVE MANUFACTURING RESINS

CROSS REFERENCE TO RELATED APPLICATIONS

This application claims the benefit of U.S. Provisional Application Ser. No. 63/014,908, filed Apr. 24, 2020, the contents of which is hereby incorporated by reference.

FIELD OF THE INVENTION

The present invention concerns resins for the manufacture of polymer objects by additive manufacturing, and methods of making objects with such resins.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

For UV-curable polyurethane dual cure resins, such as those with isocyanate and polyol combinations, it would be beneficial to have delayed action catalysts. One reason would be to ensure complete conversion of the thermal components into high molecular weight polymers, not only for higher performance objects, but also for less residuals of the isocyanate/polyol materials, while at the same time not compromising the pot-life of the resin during handling and additive manufacturing. In addition, such delayed-action catalysts could serve to reduce the baking temperature or time needed to achieve full conversion, thereby lowering production costs and turnover.

SUMMARY OF THE INVENTION

Provided herein is a dual cure resin useful for the production of an object by additive manufacturing, comprising or consisting essentially of: (a) a photoinitiator; (b) not more than 5, 10 or 20 parts per million (ppm) of a polyurethane catalyst (e.g., tin, tertiary amine, bismuth, zinc, zirconium, or nickel catalyst); (c) a polyol; (d) free (i.e., unblocked) polyisocyanate; and (e) blocked polyisocyanate, the isocyanate groups of which are blocked by reaction with an amine (meth)acrylate blocking agent. In some embodiments, the molar ratio of free polyisocyanate to blocked polyisocyanate in said composition is at least 1 to 1 (e.g., at least 1.2 to 1, or at least 1.4 to 1).

In some embodiments, the free polyisocyanate is a monomer or oligomer, and/or said blocked polyisocyanate is a monomer or oligomer.

In some embodiments, the free polyisocyanate, and optionally but in some embodiments preferably said blocked isocyanate, comprises an aliphatic polyisocyanate. The aliphatic polyisocyanate in some embodiments is selected from the group consisting of isophorone diisocyanate (IPDI), 4,4'-methylenebis(cyclohexyl isocyanate) (HMDI), hexamethylene diisocyanate (HDI), HDI trimer, and combinations thereof.

In some embodiments, the amine(meth)acrylate blocking agent is selected from the group consisting of t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof.

In some embodiments, the resin further includes: (f) a light-reactive diluent (e.g., monomeric and polymeric acrylate and methacrylate diluents such as poly(ethylene glycol) dimethacrylate, isobornyl methacrylate, lauryl methacrylate, trimethylolpropane trimethacrylate, hexanediol dimethacrylate, acrylate analogs thereof, or a combination of any thereof). In some embodiments, the light reactive diluent comprises a multi-functional, or polymeric, (meth)acrylate (e.g., poly(ethylene glycol) dimethacrylate).

In some embodiments, the resin further comprises or consists essentially of at least one additional constituent selected from the group consisting of photoabsorbers, pigments, dyes, matting agents, flame-retardants, fillers, non-reactive diluents, and combinations thereof.

Also provided is a method of making an object, comprising: (a) providing a resin as taught herein; (b) producing an intermediate object by light polymerization of said resin in an additive manufacturing process; (c) optionally cleaning said object; and then (d) heating said object, wherein said amine(meth)acrylate blocking agent is present in said resin as a blocking agent in an amount sufficient so that, upon forming an intermediate object from said resin by light polymerization in an additive manufacturing process and subsequent heating of said object, said blocked polyisocyanate de-blocks and produces free amine(meth)acrylate (in monomeric and/or polymeric form) in an amount effective to catalyze the polymerization of at least said free polyisocyanate (and optionally also said de-blocked polyisocyanate, depending on the amount of excess polyol to free polyisocyanate oligomer ratio) with said polyol, and produce said object.

In some embodiments, the cleaning step is included and is carried out by washing, wiping, blowing, centrifugal separation, or a combination thereof.

In some embodiments, the producing step is carried out by top-down or bottom-up stereolithography (e.g., continuous liquid interface production).

In some embodiments, the object is comprised of polyurethane, polyurea, or a combination thereof.

In some embodiments, the object is rigid, flexible, or elastic.

In some embodiments, the cleaning step is included and comprises collecting excess unpolymerized resin from the surface of said object (e.g., by centrifugal separation, wiping, blowing, or a combination thereof); and said method further comprises: (d) combining said excess unpolymerized resin with additional resin of step (a) to produce a blended resin; and (e) repeating steps (b) through (d) at least once, and in some embodiments preferably at least two or more times, with said blended resin to produced additional objects therefrom.

Further provided is an object produced by a method as taught herein.

The foregoing and other objects and aspects of the present invention are explained in greater detail in the specification set forth below. The disclosures of all United States patent references cited herein are to be incorporated herein by reference.

DETAILED DESCRIPTION OF ILLUSTRATIVE EMBODIMENTS

The present invention is now described more fully hereinafter, in which embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

1. Resins with Delayed Action Catalysts.

Polymerizable liquid compositions curable by actinic radiation (typically light, and in some embodiments ultraviolet (UV) light) are provided to enable the present invention. The liquid (sometimes referred to as "liquid resin," "ink," or simply "resin" herein) may include a polymerizable monomer, particularly photopolymerizable and/or free radical polymerizable monomers (e.g., reactive diluents) and/or prepolymers (i.e., reacted or larger monomers capable of further polymerization), and a suitable initiator such as a free radical initiator.

Photoinitiators useful in the present invention include, but are not limited to, diphenyl(2,4,6-trimethylbenzoyl)phosphine oxide (TPO), phenylbis(2,4,6-trimethylbenzoyl) phosphine oxide (PPO), 2-isopropylthioxanthone and/or 4-isopropylthioxanthone (ITX), etc.

Light-polymerizable monomers and/or prepolymers. Sometimes also referred to as "Part A" of the resin, these are monomers and/or prepolymers that can be polymerized by exposure to actinic radiation or light. This resin can have a functionality of two or higher (though a resin with a functionality of one can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of reactive end groups suitable for Part A constituents, monomers, or prepolymers include, but are not limited to: acrylates, methacrylates, $\alpha$-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

Heat-polymerizable monomers and/or prepolymers. Sometimes also referred to as "Part B," these constituents may comprise, consist of or consist essentially of a mix of monomers and/or prepolymers that possess reactive end groups (e.g., isocyanates and polyols) that participate in a second solidification reaction during or after the Part A solidification reaction.

Polyisocyanates (including diisocyanates) useful in carrying out the present invention include monomer an oligomeric polyisocyanates, including, but not limited to, 1,1'-methylenebis(4-isocyanatobenzene) (MDI), 2,4-diisocyanato-1-methylbenzene (TDI), methylene-bis(4-cyclohexylisocyanate) (H12MDI), hexamethylene diisocyanate (HDI), HDI trimer, isophorone diisocyanate (IPDI), 4,4'-methylenebis(cyclohexyl isocyanate) (HMDI), polymeric MDI, 1,4-phenylene diisocyanate (PPDI), and o-tolidine diisocyanate (TODI). In some embodiments, the polyisocyanates are isocyanate prepolymers, examples of which include, but are not limited to, isocyanate capped polyols, such as the reaction product of molar excess of HDI with polytetramethylene glycol (PTMEG), etc.

Additional examples include but are not limited to those given in U.S. Pat. No. 3,694,389 to Levy.

In some embodiments, resin compositions include both free polyisocyanate, and blocked polyisocyanate. The free and/or blocked polyisocyanate may include an aliphatic polyisocyanate, preferred for longer pot-life. Examples of aliphatic polyisocyanate include, but are not limited to, isophorone diisocyanate (IPDI), 4,4'-methylenebis(cyclohexyl isocyanate) (HMDI), hexamethylene diisocyanate (HDI), HDI trimer, and combinations thereof. While it may be noted that the HDI trimer has an aromatic core, it is considered an aliphatic isocyanate because the cyanate groups are separated from the aromatic core by aliphatic groups. Thus, "aliphatic polyisocyanate" as used herein are those in which the isocyanate groups have the formula —R—NCO, wherein R is an aliphatic group.

In some embodiments, the molar ratio of free polyisocyanate to blocked polyisocyanate in said composition is at least 1 to 1, such as at least 1.2 to 1 or at least 1.4 to 1 of free polyisocyanate to blocked polyisocyanate.

Examples of suitable amine(meth)acrylate blocking agents include, but are not limited to, t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof.

"ABPU" or "reactive blocked polyurethane" as used herein refers to UV-curable, (meth)acrylate blocked, polyurethane/polyurea with blocked isocyante groups such as described in U.S. Pat. Nos. 9,453,142 and 9,598,606 to Rolland et al. A particular example of a suitable reactive (or UV-curable) blocking agent for the isocyanates of the ABPU is a tertiary amine-containing (meth)acrylate (e.g., t-butylaminoethyl methacrylate, TBAEMA, tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

Examples of polyols (e.g., diols or triols) include, but are not limited to, polymeric triols such as VORONOL™ 3136 Polyol and polycaprolactone triol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis(2-hydroxyethyl) ether (HQEE), glycerol, trimethylolpropane (TMP), 1,2,6-hexanetriol, and pentaerythritol. Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al.

Polyurethane catalysts useful in carrying out the present invention include those that may catalyze the reaction of isocyanate with hydroxyl groups, and include, but are not limited to, a tin catalyst (e.g., dibutyltin dilaurate), a zirconium catalyst (e.g., zirconium chelate) such as K-KAT 36212 (King Industries, Inc.), a bismuth catalyst (e.g., bismuth carboxylate) such as K-KAT XK-651 (King Industries, Inc.), a zinc catalyst (e.g. zinc carboxylate), a nickel catalyst (e.g., nickel carboxylate), a tertiary amine catalyst (e.g., TBAEMA), etc.

Diluents. Diluents as used herein includes both light-reactive (e.g., UV-curable) diluents (for example monoacrylates, mono-methacrylates, polyacrylates, polymethacrylates, acrylamides, methacrylamides, etc.), and non-light-reactive (e.g., non-UV-curable) diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.). Monomeric and polymeric acrylate and methacrylate diluents include but are not limited to poly(ethylene glycol) dimethacrylate, isobornyl methacrylate, lauryl methacrylate, trimethylolpropane trimethacrylate, hexanediol dimethacrylate, acrylate analogs thereof, and combinations thereof. In some embodiments, the light reactive diluent comprises a multi-functional, or polymeric, (meth)acrylate (e.g., poly(ethylene glycol) dimethacrylate).

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENTH®" SBM (polystyrene-polybutadiene-polymethacrylate), and AMA (polymethacrylate-polybutylacrylate-polymethacrylate), both produced by Arkema (King of Prussia, Pa.). Other suitable block copolymers include FORTEGRA® and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPDX® produced by nanoresins AG. This is a master blend of functionalized nanosilica particles and an epoxy.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a glass transition temperature (Tg) of less than $-25°$ C., more preferably less than $-50°$ C., and even more preferably less than $-70°$ C. The Tg of the rubbery core may be well below $-100°$ C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name GENIOPERL®.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1). Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Suitable core-shell rubbers include, but are not limited to, those sold by Kaneka Corporation under the designation Kaneka Kane Ace, including the Kaneka Kane Ace 15 and 120 series of products, such as Kaneka Kane Ace MX 120, Kaneka Kane Ace MX 153, Kaneka Kane Ace MX 154, Kaneka Kane Ace MX 156, Kaneka Kane Ace MX 170, Kaneka Kane Ace MX 257 and Kaneka Kane Ace MX 120 core-shell rubber dispersions, and mixtures of two or more thereof.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Photoabsorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Flame retardants. Flame retardants that may be included in the polymerizable liquids of the present invention may include monomers or prepolymers that include flame retardant group(s). For example, in some embodiments the constituents may be brominated, i.e., contain one, two, three, four or more bromine groups (—Br) covalently coupled thereto (e.g., with total bromine groups in an amount of from 1, 2, or 5% to 15 or 20% by weight of the polymerizable liquid). Flame retardant oligomers, which may be reactive or non-reactive, may also be included in the resins of the present invention. Examples include, but are not limited to, brominated oligomers such as ICL Flame Retardant F-3100, F-3020, F-2400, F-2016, etc. (ICL Industrial Products). See also U.S. 2013/0032375 to Pierre et al. Flame retardant synergists, which when combined with halogens such as bromine synergize flame retardant properties, may also be included. Examples include, but are not limited to, antimony synergists such as antimony oxides (e.g., antimony trioxide, antimony pentaoxide, etc.), aromatic amines such as melamine, etc. See U.S. Pat. No. 9,782,947. In some embodiments, the resin composition may contain synergists in an amount of from 0.1, 0.5 or 1% to 3, 4, or 5% by weight. In some embodiments, an antimony pentoxide functionalized with triethanolamine or ethoxylated amine may be used, which is available as BurnEX® colloidal additives such as BurnEX® A1582, BurnEX® ADP480, and BurnEX® ADP494 (Nyacol® Nano Technologies, Ashland, Mass.).

Matting agents. Examples of suitable matting agents include, but are not limited to, barium sulfate, magnesium silicate, silicon dioxide, an alumino silicate, alkali alumino silicate ceramic microspheres, alumino silicate glass microspheres or flakes, polymeric wax additives (such as polyolefin waxes in combination with the salt of an organic anion), etc., including combinations thereof.

2. Additive Manufacturing of Objects.

Techniques for producing an intermediate object, or "green" intermediate, from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of bottom-up additive manufacturing methods sometimes referred to as as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, S Patent Application Pub. No. US 2017/0129167; B. Feller, US Pat App. Pub. No. US 2018/0243976 (published Aug. 30, 2018); M. Panzer and J. Tumbleston, US Patent Application Pub. No. US 2018/0126630 (published May 10, 2018); K. Willis and B. Adzima, US Patent Application Pub. No. US 2018/0290374 (Oct. 11, 2018); L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733).

3. Further Curing.

Once the intermediate object has been formed and optionally cleaned (e.g., by wiping, blowing, centrifugal separation/spinning, washing, etc.), the object is then further cured, such as by heating. Heating may be active heating (e.g., baking in an oven, such as an electric, gas, solar oven or microwave oven, or a combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

4. Resin Recovery and Blending.

Intermediate objects produced from the resins described herein can have excess uncured resin on the surface thereof, which is typically removed prior to further curing of the object. Owing to the advantageous extension of pot-life achieved with the resins described herein, such excess resin can be recovered, blended with additional fresh resin, and the blended resin used to make additional objects by the methods described herein.

Particular aspects of the resins and methods described herein are explained in greater detail in the following non-limiting examples.

EXAMPLES

In some embodiments disclosed herein, unblocked polyisocyanates (including polyisocyanate prepolymers) are used as the thermally-curable component in a UV-curable dual cure resin to generate polyurethane/polyurea final parts without blocking chemistry. Features that are preferred to achieve this include sufficient pot-life of the resin, printabiltity, and final property performance. This has been successfully demonstrated by producing slabs from such a resin that have tensile properties suitable for high performance parts, the resin formulated using commercial products only, as shown in the Examples below.

The first step for demonstrating pot-life was to achieve a resin that has a pot-life (i.e., remains liquid and flowable, typically under <10,000 cP, during processing, such as >4 hours, or over 16 hours). This was achieved using an HDI-polyisocyanate with polyol curatives (mixture of polyester and polyether). Typically, pot-lifes are only up to 1 hour, if not lower, due to the use of aromatic isocyanates, amine curatives, or catalysts that reduce the pot-life.

Significantly, it was found that TBAEMA can be used, as a blocking group (that is, used in the part B component to immediately react with the isocyanate prior to printing), such that the green strength of the intermediate object is improved.

The final object after baking showed good tensile properties, demonstrating a successful dual cure performance in the absence of any additional thermal catalyst (meaning that the TBAEMA is functioning as a delayed action thermal catalyst).

A benefit of this system is the access to a large variety of polyisocyanate/prepolymers and polyol/polyamines without custom polymer synthesis or the need for polymer regulatory filings (such as TSCA or REACh registrations). This could be used for elastomers to rigid materials. In the case of ABPUs, rigid materials have the highest loadings of TBAEMA, so they may benefit significantly from such an approach. It also provides access to highly crosslinked objects (such as demonstrated in the Examples) from resins that have low viscosity, which may be preferred for certain applications.

Materials i) Adiprene LFH E1192 hexamethylene (HDI) isocyanate-terminated polyether prepolymer with low free HDI content (E1192, Lanxess Solutions US Inc.)

ii) hexamethylene (HDI) isocyanate trimer, Desmodur N 3800 (N3800, Covestro AG)

iii) VORONOL™ 3136 Polyol (V3136, Dow Chemical)

iv) Polycaprolactone triol Mn ~300 (TCPL300, Sigma Aldrich)

v) Trimethylolpropane (TMP, Tokyo Chemical Industry)

vi) 2-hydroxyethyl methacrylate (HEMA, Sigma Aldrich)

vii) 2-(tert-butylamino)ethyl methacrylate (TBAEMA, Novasol)

viii) Isobornyl methacrylate (IBOMA, SR423A, Sartomer)

ix) Tetraethylene glycol dimethacrylate (TTEGDMA, Sigma Aldrich)

x) Ethyl (2,4,6-trimethylbenzoyl)phenyl phosphinate (TPO-L, PL Industries)

Examples A-C

All components (Table 1) except TBAEMA were added into a container and heated for up to 1 hour at 60° C. until all solids were dissolved. TBAEMA was then added and the mixture immediately mixed by planetary centrifugal mixer at 2000 rpm for one minute. The warm mixtures were then quickly poured into 50×50 mm² PTFE molds, up to 5 mm thick. The mixtures were then UV-cured for 30 seconds in a Dymax ECE UV flood lamp chamber (~100 mW/cm²). The gelled samples were then flipped over in the mold and UV-cured for an additional 30 seconds. The samples were baked in the molds. The surface ATR-FTIR spectrum, measured with a Bruker Alpha Spectrometer under ambient conditions, was then measured to determine residual isocyanate (NCO) content (peak area at 2270 cm$^{-1}$ compared to ≥0.1 wt % NCO standards). Results for all three resin formulations are given in Table 1 below.

TABLE 1

Parts of components added, parameters, and residual NCO content for Examples A-C.

| Parts by Weight | Example A | Example B | Example C |
|---|---|---|---|
| E1192 diisocyanate | 56.3 | 57.0 | 56.2 |
| V3136 polyol | 10.5 | 11.5 | 10.5 |
| TMP | 5.3 | 5.7 | 5.3 |
| IBOMA | 10.0 | 10.0 | 10.0 |
| TTEGDMA | 10.0 | 10.0 | 10.0 |
| TPO-L | 1.3 | 1.4 | 1.3 |
| HEMA | 5.3 | — | 5.3 |
| TBAEMA | — | 5.7 | 0.2 |
| NCO Index | 0.95 | 0.95 | 0.94 |
| Bake Temperature (° C.) | 140 | 140 | 130 |
| Bake Time (hours) | 2 | 2 | 4 |
| Residual NCO (%) | 0.1-0.5 | n.d.* | n.d.* |

*n.d. = not detectable (<0.1%)

Example D

All components in Table 2 except TBAEMA were added into a container and mixed by planetary centrifugal mixer at 2000 rpm for two minutes. TBAEMA was then added and the mixture immediately mixed by planetary centrifugal mixer at 2000 rpm for one minute. The resin viscosity was measured immediately on a Brookfield viscometer (Model DV1). Part of the resin was stored in a closed glass vial at ambient temperature (~24° C.) and the viscosity re-measured after 24 hours. The remaining mixture was then poured onto a PTFE sheet to produce ~1 mm resin thickness. The mixture was then UV-cured for 60 seconds in a Dymax ECE UV flood lamp chamber (~100 mW/cm²). The sample was baked on the PTFE sheet. The surface ATR-FTIR spectrum, measured with a Bruker Alpha Spectrometer under ambient conditions, was then measured to determine residual isocyanate content (peak area at 2270 cm$^{-1}$ compared to ≥0.1 wt % NCO standards). No residual NCO content was detected (<0.1%).

TABLE 2

Parts of components added, parameters, and residual NCO content for Example D.

| Parts by Weight | Example D |
|---|---|
| N3800 isocyanate trimer | 58.2 |
| V3136 polyol | 3.9 |
| TCPL300 triol | 11.6 |
| IBOMA | 10.0 |
| TTEGDMA | 10.0 |
| TPO-L | 1.0 |
| HEMA | 2.9 |
| TBAEMA | 3.5 |
| NCO Index | 0.95 |
| Bake Temperature (° C.) | 160 |
| Bake Time (hours) | 2 |
| Residual NCO (%) | n.d. |
| Initial - Viscosity at 25° C. (cP) | 1345 |
| After 24 hours - Viscosity at 25° C. (cP) | 4300 |

The foregoing is illustrative of the present invention, and is not to be construed as limiting thereof. The invention is defined by the following claims, with equivalents of the claims to be included therein.

What is claimed is:

1. A method of making an object, comprising:
   (a) providing a dual cure resin comprising:
      (i) a photoinitiator;
      (ii) not more than 20 ppm of a polyurethane catalyst;
      (iii) a polyol;
      (iv) free polyisocyanate; and
      (v) blocked polyisocyanate, the isocyanate groups of which are blocked by reaction with an amine (meth)acrylate blocking agent wherein the molar ratio of free polyisocyanate to blocked polyisocyanate in said dual cure resin is at least 1 to 1;
   (b) producing an intermediate object by light polymerization of said resin in an additive manufacturing process;
   (c) optionally cleaning said intermediate object; and then
   (d) heating said intermediate object, wherein said amine (meth)acrylate blocking agent is present in said resin as a blocking agent in an amount sufficient so that, upon forming the intermediate object from said resin by light polymerization in the additive manufacturing process and subsequent heating of said intermediate object, said blocked polyisocyanate de-blocks and produces free amine (meth)acrylate in an amount effective to catalyze the polymerization of at least said free polyisocyanate with said polyol, and produce said object.

2. The method of claim 1, wherein said cleaning step is included and is carried out by washing, wiping, blowing, centrifugal separation, or a combination thereof.

3. The method of claim 1, wherein said producing step is carried out by top-down or bottom-up stereolithography.

4. The method of claim 1, wherein said object is comprised of polyurethane, polyurea, or a combination thereof.

5. The method of claim 1, wherein said cleaning step is included and comprises collecting excess unpolymerized resin from the surface of said intermediate object; and said method further comprises:
   (e) combining said excess unpolymerized resin with additional resin of step (a) to produce a blended resin; and
   (f) repeating steps (b) through (d) at least once with said blended resin to produce additional objects therefrom.

6. The method of claim 1, wherein said free polyisocyanate is a monomer or oligomer, and/or said blocked polyisocyanate is a monomer or oligomer.

7. The method of claim 1, wherein the molar ratio of free polyisocyanate to blocked polyisocyanate in said dual cure resin is at least 1.2 to 1.

8. The method of claim 1, wherein the molar ratio of free polyisocyanate to blocked polyisocyanate in said dual cure resin is at least 1.4 to 1.

9. The method of claim 1, wherein said free polyisocyanate comprises an aliphatic polyisocyanate.

10. The method of claim 9, wherein said aliphatic polyisocyanate is selected from the group consisting of isophorone diisocyanate (IPDI), 4,4'-methylenebis(cyclohexyl isocyanate) (HMDI), hexamethylene diisocyanate (HDI), HDI trimer, and combinations thereof.

11. The method of claim 1, wherein said blocked isocyanate comprises an aliphatic polyisocyanate.

12. The method of claim 11, wherein said aliphatic polyisocyanate is selected from the group consisting of isophorone diisocyanate (IPDI), 4,4'-methylenebis(cyclohexyl isocyanate) (HMDI), hexamethylene diisocyanate (HDI), HDI trimer, and combinations thereof.

13. The method of claim 1, wherein said amine (meth)acrylate blocking agent is selected from the group consisting of t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof.

14. The method of claim 1, wherein said dual cure resin further comprises:
(vi) a light-reactive diluent.

15. The method of claim 14, wherein said light reactive diluent comprises a multi-functional, or polymeric, (meth)acrylate.

16. The method of claim 1, wherein said dual resin further comprises at least one additional constituent selected from the group consisting of photoabsorbers, pigments, dyes, matting agents, flame-retardants, fillers, non-reactive diluents, and combinations thereof.

* * * * *

UNITED STATES PATENT AND TRADEMARK OFFICE
CERTIFICATE OF CORRECTION

PATENT NO. : 11,655,329 B2  
APPLICATION NO. : 17/234019  
DATED : May 23, 2023  
INVENTOR(S) : Andrew Gordon Wright Page 1 of 1

It is certified that error appears in the above-identified patent and that said Letters Patent is hereby corrected as shown below:

In the Specification

Column 6, Line 44: Please correct "NANOPDX™" to read --NANOPOX™--

In the Claims

Column 12, Line 33, Claim 1: Please correct "agent wherein" to read --agent; wherein--

Signed and Sealed this  
First Day of August, 2023

Katherine Kelly Vidal  
*Director of the United States Patent and Trademark Office*